US007839743B2

(12) United States Patent
Hayashi

(10) Patent No.: US 7,839,743 B2
(45) Date of Patent: Nov. 23, 2010

(54) OPTICAL DISC APPARATUS AND DISCRIMINATING METHOD FOR KIND OF OBJECTIVE LENSES

(75) Inventor: Toshiyuki Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 568 days.

(21) Appl. No.: 11/898,182

(22) Filed: Sep. 10, 2007

(65) Prior Publication Data
US 2008/0062851 A1   Mar. 13, 2008

(30) Foreign Application Priority Data
Sep. 13, 2006   (JP) .............................. 2006-247572

(51) Int. Cl.
    *G11B 7/135* (2006.01)
(52) U.S. Cl. ................. 369/53.2; 369/112.24
(58) Field of Classification Search ............ None
    See application file for complete search history.

(56) References Cited

U.S. PATENT DOCUMENTS

2005/0083813 A1* 4/2005 Ogasawara ................. 369/53.2
2005/0152252 A1   7/2005 Horimoto ................... 369/53.23

FOREIGN PATENT DOCUMENTS

| EP | 0 773 537 A2 | 5/1997 |
|----|---|---|
| EP | 1 111 603 A1 | 6/2001 |
| EP | 1 526 520 A2 | 4/2005 |
| JP | A-H09-305980 | 11/1997 |
| JP | A-H10-198969 | 7/1998 |
| JP | A-2003-099958 | 4/2003 |

* cited by examiner

*Primary Examiner*—Van N Chow
(74) *Attorney, Agent, or Firm*—Morgan Lewis & Bockius LLP

(57) ABSTRACT

An optical disc apparatus includes an amplitude obtaining portion receiving S shaped waveform information of focus error signal from a focus error signal processing portion to obtain amplitude of the S shaped waveform and a discriminating portion discriminating kind of objective lens disposed in a light path of an optical pickup device. The discriminating portion changes controlled variable of a spherical aberration compensating element into a plurality of prescribed control values, and obtains the amplitude of S shaped waveform from an amplitude obtaining portion for each of the control values. Then the discriminating portion performs discrimination of kind of the objective lens disposed in the light path based on that a rate of change of the amplitude of S shaped waveform to change of controlled variable of the spherical aberration compensating element is different in response to kind of the objective lens.

3 Claims, 6 Drawing Sheets

F I G. 5A
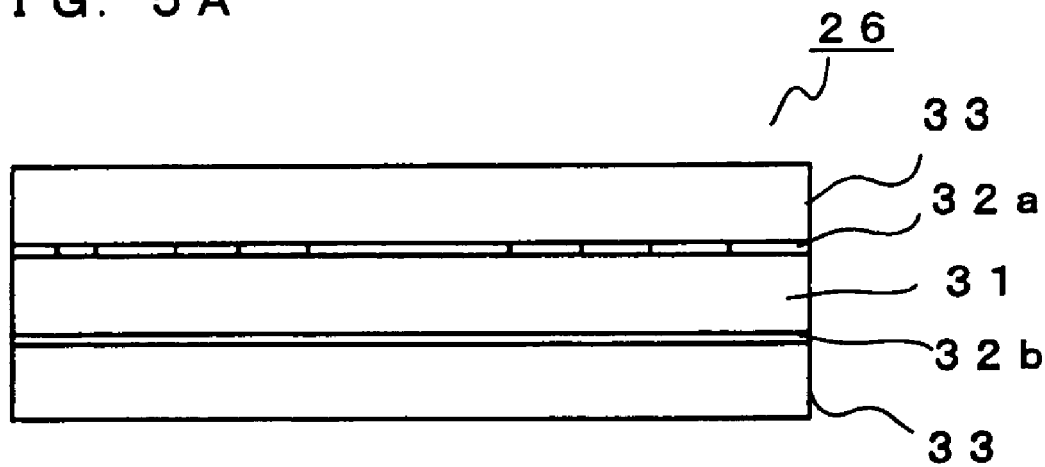
F I G. 5B
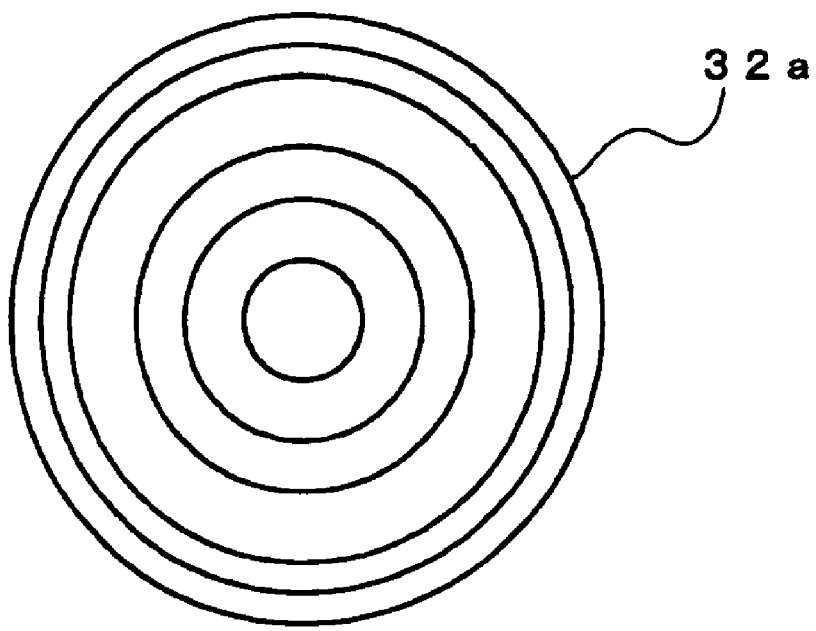

OPTICAL DISC APPARATUS AND DISCRIMINATING METHOD FOR KIND OF OBJECTIVE LENSES

This application is based on Japanese Patent Application No. 2006-247572 filed on Sep. 13, 2006, and the contents of which are hereby incorporated by reference.

BACKGROUND OF THE INVENTION

1. Field of the Invention

The present invention relates to an optical disc apparatus which includes a plurality of objective lenses in an optical pickup device and changes the objective lenses to utilize in response to kind of an optical recording medium, especially, the present invention relates to the optical disc apparatus having a structure which can prevent an improper setting of the objective lenses. Further, the present invention relates to a discriminating method for kind of the objective lenses in the optical pickup device which changes a plurality of the objective lenses to utilize.

2. Description of Related Art

Optical recording media including a compact disc (hereinafter referred to as "a CD") and a digital versatile disc (hereinafter referred to as "a DVD") have become commonplace and widely available. Further, in order to increase a quantity of information recorded on the optical recording medium, researches to realize higher recording density of the optical recording medium have been carried on recently. As a result, a high density optical recording medium such as a Blu-ray Disc (Registered Trademark; hereinafter referred to as "a BD") is being available in the market, for example.

In the optical disc apparatus which performs recording on or reproducing from such an optical recording medium, an optical pickup device which irradiates a light beam to the optical recording medium to enable recording of information or reproducing of information is included. Here, depending on kind of the optical recording medium, a numerical aperture (NA) of the objective lens and a wavelength of a light source become different which are used for the optical pickup device. For example, the NA of the objective lens is 0.50 and the wavelength of the light source is 780 nm for a CD, the NA of the objective lens is 0.65 and the wavelength of the light source is 650 nm for a DVD, and the NA of the objective lens is 0.85 and the wavelength of the light source is 405 nm for a BD.

As above described, depending on the kind of the optical recording medium, because the numerical aperture of the objective lens and the wavelength of the light source which are utilized become different, it is conceivable to use different optical pickup device for each optical recording medium. However, because such structure causes problems that size of the optical disc apparatus becomes large and the like, it is usual to employ a structure in that one optical pickup device can perform reproducing or the like of information for a plurality of kinds of the optical recording media.

In the optical pickup devices which can be utilized for a plurality of kinds of the optical recording media, there is an optical pickup device having a structure that one objective lens can be applied to three kinds of the optical recording media, for example, such as a CD, a DVD, and a BD. However, such an objective lens is difficult to design and causes a problem of cost rising. Therefore, there is an optical pickup device in which the objective lens for a BD that requires high NA and the objective lens for a CD and a DVD are composed separately and a plurality of kinds of the objective lenses are changed to utilize, for example.

For the optical disc apparatus which changes a plurality of kinds of the objective lenses to utilize, the objective lenses are generally changed by a method in which a permanent magnet and an electromagnet are used such that the electromagnet is made generate a kick pulse to repel the permanent magnet and the repulsive force is utilized to change the objective lenses. However, when this kind of method is employed, there may be a case that the change of the objective lenses is not performed because the repulsive force is so strong that objective lenses bounce. Further, there may be a case that a primary objective lens is changed to a different objective lens in a light path when large acceleration of gravity is applied or the like from outside for a member supporting the objective lens to move by an accident.

When reproducing of information from the optical recording medium or recording of information to the optical recording medium is performed in a state that the objective lens is not the primary objective lens in the light path, reproducing or recording of information is not performed properly and there is a possibility that various troubles happen in the optical disc apparatus.

For this purpose, a technology has been proposed conventionally that recognizes kind of an objective lens which is disposed in a light path for an optical disc apparatus which has a plurality of objective lenses and changes the objective lenses to utilize. In JP-A-H09-305980, for example, a permanent magnet supported by a fixing member and a Hall element supported by a movable member which holds the objective lenses, are arranged so as to oppose, a magnetic flux passing the Hall element is configured to change in response to kind of an objective lens selected. This arrangement realizes a structure detecting kind of objective lenses disposed in a light path.

Further, in JP-A-H10-198969 a structure has been proposed in order to discriminate kind of a first objective lens and a second objective lens. The structure includes a reflecting means disposed in a prescribed position in a lens holder supporting objective lenses, and a detecting means disposed in a prescribed position in a lens holder supporting member so as to oppose to the reflecting means when the first objective lens is disposed in a light path, emitting light and receiving a reflected light generated by the emission of light from the reflecting means.

In addition, in JP-A-2003-099958 technology has been proposed in order to discriminate kind of an objective lens in a light path. The technology utilizes difference of amount of reflected light from an optical recording medium in response to kind of the objective lens disposed in the light path.

However, in a case where discrimination of kind of an objective lens disposed in a light path is performed by utilizing the structure disclosed in JP-A-H09-305980 or JP-A-H10-198969, it is necessary to arrange newly a detecting device discriminating kind of the objective lens. Therefore, it causes problem of cost increase, problem of weight increase of a movable member to enable the movement of the objective lens and the like.

Further in a case where discrimination of kind of an objective lens disposed in a light path is performed by utilizing the structure disclosed in JP-A-2003-099958, it is not necessary to arrange newly a detecting device unlike cases of JP-A-H09-305980 and JP-A-H10-198969, however, there may be a problem that discrimination of kind of an objective lens is erroneously performed because degree of reflection of an optical recording medium varies widely due to nonuniformity of the optical recording medium when it is manufactured and the like.

SUMMARY OF THE INVENTION

In view of the problems described above, it is an object of the present invention to provide an optical disc apparatus able to prevent an improper setting of an objective lens disposed in a light path without arranging newly a detecting device in an optical disc apparatus including a plurality of kinds of the objective lenses and changing the objective lenses to utilize in response to kind of an optical recording medium. Further it is another object of the present invention to provide a discriminating method for kind of the objective lenses able to discriminate correctly kind of the objective lens disposed in the light path without arranging newly the detecting device in an optical pickup device including a plurality of kinds of objective lenses.

To attain the object described above, the present invention is characterized by that an optical disc apparatus including: a plurality of light sources emitting light beam having different wavelength respectively; a plurality of objective lenses condensing the light beam emitted from the light source on a recording surface of an optical recording medium; a spherical aberration compensating element disposed between the light source and the objective lens to perform compensation of spherical aberration; and a memory portion memorizing information. The optical disc apparatus selects one objective lens to be disposed in the light path from a plurality of the objective lenses in response to kind of the optical recording medium and utilizes the objective lens. The optical disc apparatus is further characterized by including an amplitude obtaining portion obtaining S shaped waveform of focus error signal by emitting the light beam from the light source and moving the objective lens disposed in the light path in an optical axis direction and obtaining amplitude from the S shaped waveform; and a discriminating portion changing controlled variable of the spherical aberration compensating element into a plurality of prescribed control values, obtaining the amplitude of S shaped waveform from the amplitude obtaining portion for the respective control value, and performing discrimination of kind of the objective lens disposed in the light path based on that rate of change of the amplitude of S shaped waveform to change of the controlled variable becomes different in response to kind of the objective lens.

According to this structure it becomes possible to perform the discrimination of kind of the objective lens without arranging a detecting device separately. Further, because the discriminating portion has a structure discriminating kind of the objective lens by utilizing spherical aberration depending on design of the objective lens, it becomes possible to perform the discrimination of kind of the objective lens without receiving effect due to variation in degree of reflection of the optical recording medium. Therefore, it becomes possible to provide an optical disc apparatus including a plurality of kinds of the objective lenses, changing the objective lenses to utilize in response to kind of an optical recording medium, and further able to prevent an improper setting of the objective lens disposed in a light path without arranging newly a detecting device.

Further the present invention is preferable that in the optical disc apparatus which is structured as above described, the discriminating portion normalizing the amplitude of S shaped waveform obtained when the respective control value is a prescribed control value to make the amplitude of S shaped waveform become a constant value, calculating an inclination of approximated straight line showing relation between the controlled variable and the normalized amplitude of S shaped waveform, and discriminating kind of the objective lens disposed in the light path by comparison between the inclination of approximated straight line and a threshold value memorized beforehand in the memory portion.

According to this structure, it becomes possible to provide an optical disc apparatus easily able to prevent improper setting of an objective lens disposed in a light path from an optical disc apparatus structured conventionally.

Further to attain the object described above the present invention is characterized by that a discriminating method discriminating kind of objective lens disposed in a light path of an optical pickup device including: a plurality of light sources emitting light beam having different wavelength respectively; a plurality of objective lenses condensing the light beam emitted from the light source on a recording surface of an optical recording medium; and a spherical aberration compensating element disposed between the light source and the objective lens to perform compensation of spherical aberration. The optical pickup device selects one objective lens to be disposed in the light path from a plurality of the objective lenses in response to kind of the optical recording medium and utilizes the objective lens. The discriminating method is further characterized by including a step changing controlled variable of the spherical aberration compensating element into a plurality of prescribed control values, and obtaining S shaped waveform of focus error signal by emitting the light beam from the light source, moving the objective lens disposed in the light path in an optical axis direction and obtaining amplitude from the S shaped waveform for the respective control value; a step normalizing the amplitude of S shaped waveform obtained when the respective control value is a prescribed control value to make the amplitude of S shaped waveform become a constant value; a step calculating an inclination of approximated straight line showing relation between the controlled variable and the normalized amplitude of S shaped waveform; and a step deciding kind of the objective lens disposed in the light path by comparison between the inclination of approximated straight line and a threshold value obtained beforehand.

According to this structure because the structure discriminates kind of an objective lens by utilizing a spherical aberration compensating element which is included in an optical pickup device, it becomes possible to perform discrimination of kind of the objective lens without necessity to arrange a detecting device separately, and without effect due to variation in degree of reflection of an optical recording medium. Therefore, it becomes possible to provide a discriminating method for kind of the objective lens which can discriminate correctly kind of the objective lens disposed in a light path in an optical pickup device which includes a plurality of kinds of objective lenses without arranging newly a detecting device.

BRIEF DESCRIPTION OF THE DRAWINGS

FIG. 5A is a schematic cross sectional view to show a structure of a spherical aberration compensating element included in the optical disc apparatus according to the present embodiment.

FIG. 5B is a schematic plan view to show a structure of a transparent electrode arranged in the spherical aberration compensating element included in the optical disc apparatus according to the present embodiment.

DETAILED DESCRIPTION OF THE PREFERRED EMBODIMENTS

Hereinafter, contents of the present invention will be described in detail with reference to the attached drawings. However, the embodiments described here are merely examples, and the present invention is not limited to the embodiments described here.

(Structure of an Optical Disc Apparatus)

Figure 1:
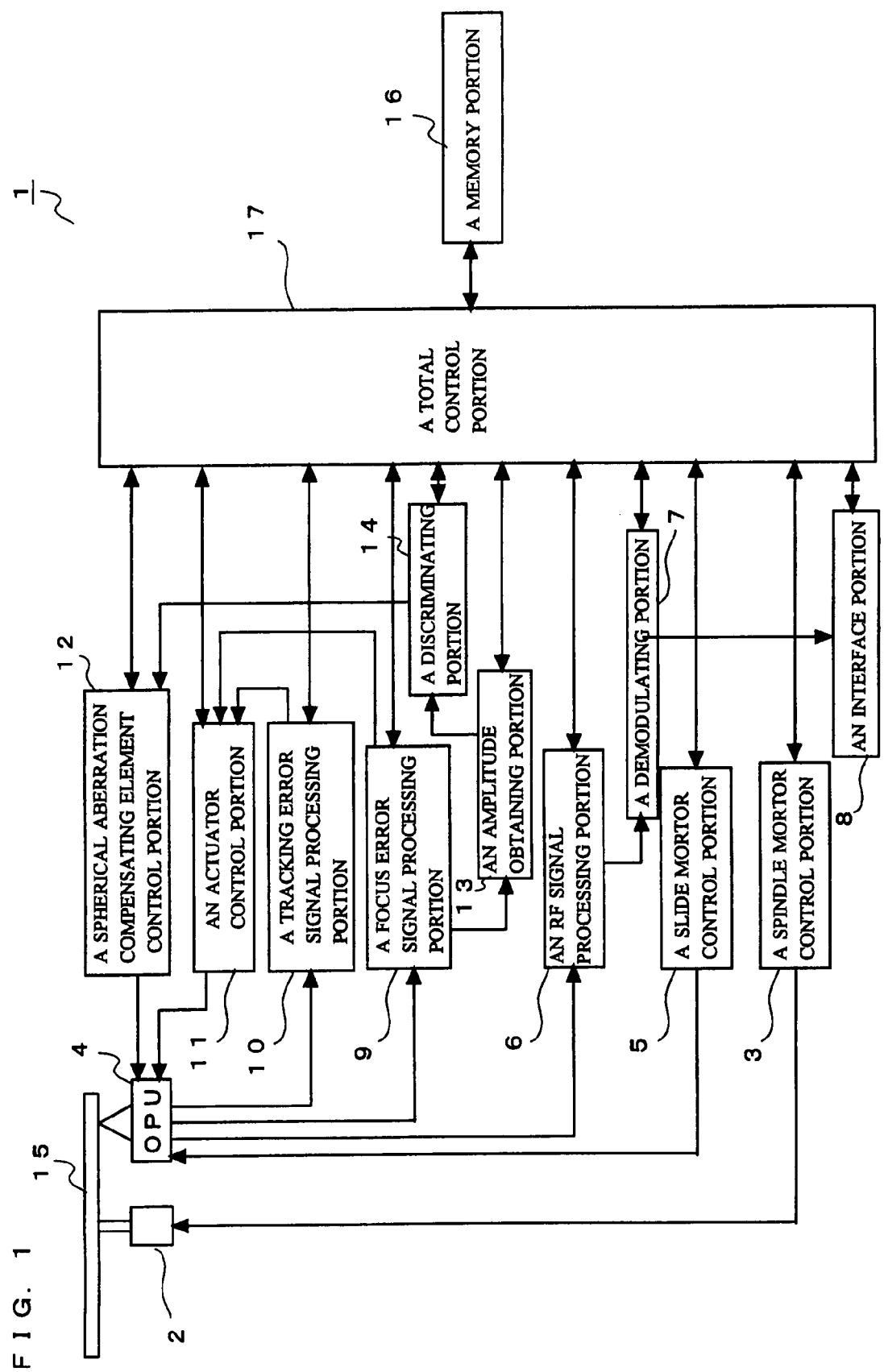
FIG. 1 is a block diagram to show a structure of an optical disc apparatus according to the present embodiment.

First, structure of an optical disc apparatus according to the present embodiment will be described. FIG. 1 is a block diagram to show a structure of an optical disc apparatus according to the present embodiment. The optical disc apparatus 1 is configured to be possible to reproduce information of an optical disc (an optical recording medium) 15 and record information to the optical disc 15. Here, kinds of the optical disc 15 to/of which the optical disc apparatus 1 can perform recording or reproducing, are a CD, a DVD, and a BD.

Reference numeral 2 designates a spindle motor, and the optical disc 15 is held detachably on a chuck portion (not shown) which is disposed on an upper part of the spindle motor 2. The spindle motor 2 rotates continuously the optical disc 15 when information of the optical disc 15 is recorded or reproduced. Rotation control of the spindle motor 2 is performed by a spindle motor control portion 3.

Figure 2:
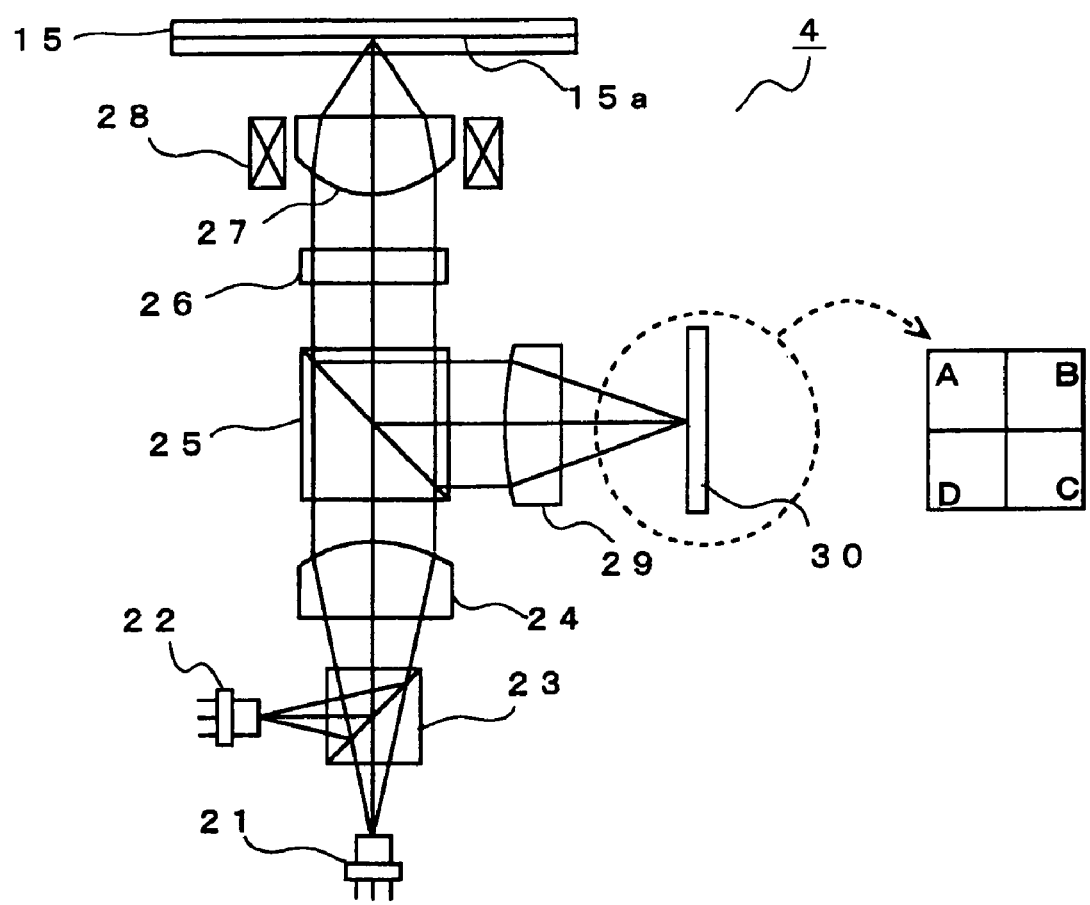
FIG. 2 is a schematic diagram to show an optical system of optical pickup device included in the optical disc apparatus according to the present embodiment.

Reference numeral 4 designates an optical pickup device irradiating a laser beam emitted from a light source to the optical disc 15 to enable recording information to the optical disc 15 and reproducing information recorded on the optical disc 15. FIG. 2 is a schematic diagram to show an optical system of the optical pickup device 4. As shown in FIG. 2, the optical pickup device 4 includes a first light source 21, a second light source 22, a color synthesis prism 23, a collimator lens 24, a beam splitter 25, a spherical aberration compensating element 26, an objective lens 27, a condensing lens 29, and a photo detector 30. Here, a structure of an optical system to form the optical pickup device is not limited to the structure above described, and various modifications can be performed, of course.

Both of the first light source 21 and the second light source 22 are laser diodes (LD). The first light source 21 is a light source which corresponds to a BD, and the first light source 21 emits a laser beam having a wavelength of 405 nm, for example. On the other hand, the second light source 22 is a two-wavelength combination type LD and is a light source which corresponds to a CD and a DVD, and the second light source 22 emits a laser beam having a wavelength of 780 nm (a laser beam for a CD) and a laser beam having a wavelength of 650 nm (a laser beam for a DVD), for example.

In the optical pickup device 4, the laser beam emitted from the light source 21 or 22 passes the color synthesis prism 23 which makes optical axes of the laser beams emitted from the first light source 21 and the second light source 22 the same, is converted into parallel rays by the collimator lens 24, and passes the beam splitter 25. Then, spherical aberration compensation is performed for the light beam by the spherical aberration compensating element 26 whose detail will be described later, and the light beam is condensed by the objective lens 27 on a recording surface 15a of the optical disc 15 on which information is recorded. Here, the optical pickup device 4 is structured to change to utilize two kinds of objective lenses, one kind is for a CD/DVD which is utilized to perform recording or reproducing of a CD and a DVD and the other kind is for a BD which is utilized to perform recording or reproducing of a BD, the detail will be described later.

Reflected light which is reflected by the recording surface 15a passes the objective lens 27 and the spherical aberration compensating element 26 in this order, then the reflected light is reflected by the beam splitter 25 and is condensed on a receiving portion of the photo detector 30 by the condensing lens 29. The photo detector 30 converts light information which is included in the received light beam into electric signal.

Now back to FIG. 1, a slide motor control portion 5 controls driving of a slide motor (not shown) which is arranged such that the optical pickup device 4 can move, and by this arrangement movement of the optical pickup device 4 in a radial direction is controlled.

An RF signal processing portion 6 processes RF signal which is obtained by the photo detector 30 (See, FIG. 2) of the optical pickup device 4, and supplies the processed signal to a demodulating portion 7.

The demodulating portion 7 performs demodulation of data and detection of an error in the data as well. When an error is detected, the demodulating portion 7 performs correcting process of the data if the error is correctable, and supplies a reproduced data to an interface portion 8. Here, when reproduced error whose correcting process is impossible is generated, re-reading of data (retry) is achieved by a well known manner.

The interface portion 8 outputs the reproduced data which is supplied by the demodulating portion 7 to external devices such as a personal computer (not shown) and the like.

A focus error signal processing portion 9 generates a focus error signal by using a signal which is detected by the photo detector 30 in the optical pickup device 4. The photo detector 30 has detecting surfaces which are divided in four sections A, B, C, and D as shown in FIG. 2 and a focus error signal processing portion 9 is configured to generate the focus error signal by difference of traces (A+C)−(B+D) of detected signal from each of the detecting surfaces A to D. The focus error signal generated by the focus error signal processing portion 9 is made possible to be supplied to an actuator control portion 11 and an amplitude obtaining portion 13 whose details will be described later.

A tracking error signal processing portion 10 generates a tracking error signal by using signal which is detected by the photo detector 30 in the optical pickup device 4. The tracking error signal is structured to be generated by difference of sum of right and left (A+B)−(C+D) of detected signal from each of the detecting surfaces A to D (See, FIG. 2) of the photo detector 30. The tracking error signal generated by the tracking error signal processing portion 10 is made possible to be supplied to the actuator control portion 11.

Here, in the present embodiment a structure is employed in which the focus error signal and the tracking error signal are obtained by division into four sections of the detecting surface of the photo detector 30, the structure to obtain the focus error signal and the tracking error signal is not limited to this structure and it is possible to modify variously without departing from the object of the present invention. That is, a structure or the like may be employable in which as to the focus error signal so called "spot size method" is utilized to obtain and as to the tracking error signal so called "correct far-field method" is utilized to obtain, for example.

The actuator control portion 11 supplies a driving signal to an actuator 28 on which the objective lens 27 is mounted (See, FIG. 2 for both of them) based on the signals sent from the focus error signal processing portion 9 and the tracking error signal processing portion 10. The actuator 28 which is supplied with the driving signal performs focus control for focusing by moving the objective lens 27 along the focusing direction that is parallel to its optical axis direction and tracking control to match spot position of the laser beam on a track position that is formed on the optical disc 15 by moving the objective lens 27 in direction parallel to a radial direction of the optical disc 15 by driving the respective portions based on the supplied signal.

The actuator control portion 11 also performs controls of the actuator 28 when obtaining S shaped waveform of the focus error signal by moving the objective lens 27 in a focusing direction (direction to become closer to the optical disc 15 or direction to become away from the optical disc 15), or when the objective lens is changed whose detail will be described later, or the like.

Figure 3:
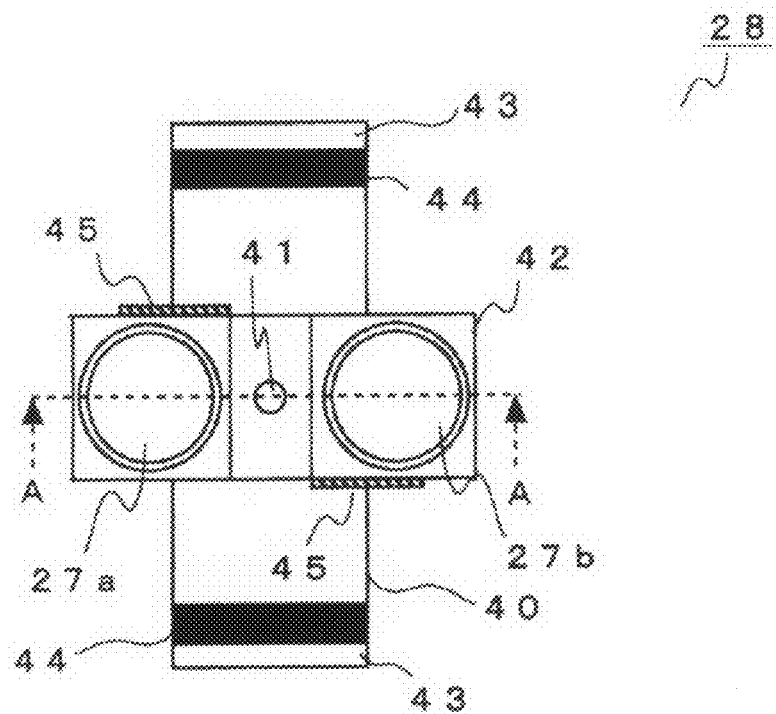
FIG. 3 is a schematic plan view to show a structure of an actuator on which objective lens is mounted that is included in the optical disc apparatus according to the present embodiment.
Figure 4:
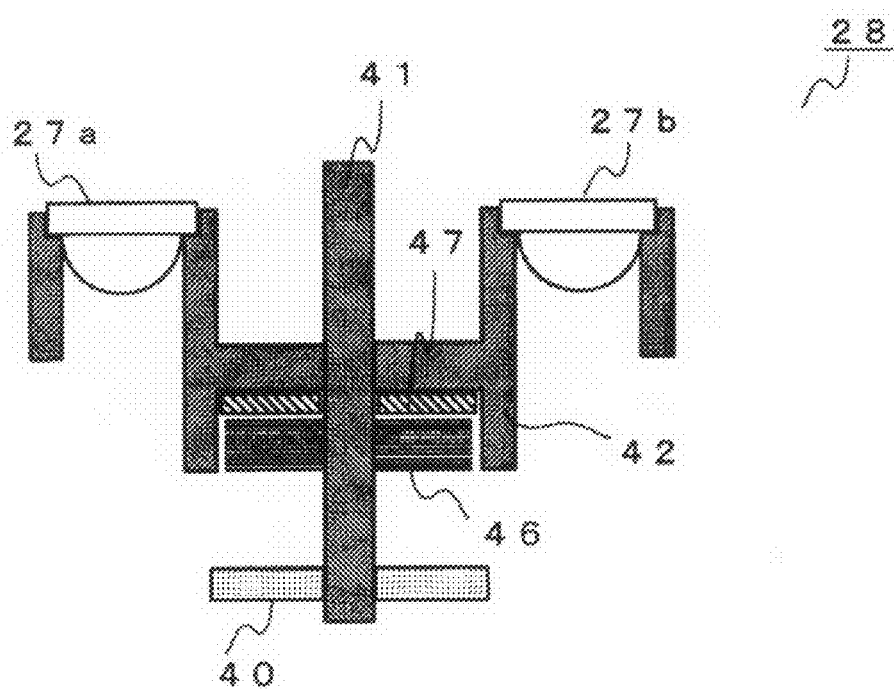
FIG. 4 is a schematic cross sectional view when cut along the line A-A shown in FIG. 3.

Hereinafter a structure of the actuator 28 on which the objective lens 27 is mounted will be described with reference to FIG. 3 and FIG. 4. FIG. 3 is a schematic plan view to show a structure of the actuator 28, and FIG. 4 is a schematic cross sectional view when cut along the line A-A shown in FIG. 3.

The actuator 28 includes an actuator base 40, a sliding axis 41 which is arranged to stand in perpendicular direction to the actuator base 40, a lens holder 42 which is supported slidably by the sliding axis 41 to hold the objective lens 27a for a CD/DVD and the objective lens 27b for a BD, two yokes 43 which is arranged to stand on the actuator base 40, and two permanent magnets 44 which are arranged to stand inside of the yoke 43 on the actuator base 40. Here, the actuator base 40, the sliding axis 41 and the yokes 43 are made by magnetic material such as steel, for example, in order to form a magnetic path.

In lower side of the lens holder 42, a focusing coil 46 and a plate like magnetic piece 47 are joined and held. By existence of the magnetic piece 47, even in turn-off time when control current passing through the focusing coil 46 is cut off, it becomes possible to keep the lens holder 42 at a neutral position in a floating state, therefore, lens shift sensitivity of the objective lenses 27a, 27b are improved.

The focusing coil 46 is joined and held on the lens holder 42 at lower side of the magnetic piece 47 such that it is wound to surround the sliding axis 41. When current is passed in the focusing coil 46, the lens holder 42 is moved in the focusing direction by interaction between magnetic flux generated by one pair of the permanent magnets 44 which are disposed so as to sandwich the lens holder 42, i.e., to sandwich the focusing coil 46 and magnetic flux generated by current passing through the focusing coil 46. By this arrangement, the focus control of the objective lenses 27a, 27b becomes possible.

Further, on side surface of the lens holder 42 opposing to the permanent magnets 44, the tracking coils 45 which are formed in rectangular shape are arranged so as to be substantially symmetrical with respect to the sliding axis 41. Here, the tracking coils 45 are disposed such that a part of the tracking coils 45 deviates from positions to be sandwiched by the opposing permanent magnets 45 in order to avoid influence of magnetic force by the permanent magnets 44. Enhancing torque which acts on the lens holder 42 becomes possible by such arrangement.

When current is passed in the tracking coils 45, the lens holder 42 is moved to turn around the sliding axis 41 by interaction between magnetic flux generated by the permanent magnets 44 and magnetic flux generated by current passing through the tracking coils 45. By this arrangement tracking control of the objective lenses 27a, 27b become possible. Further, by rotating the lens holder 42 by 180 degrees, changing between the objective lens 27a and 27b one of which is disposed in the light path of the optical pickup device 4 becomes also possible.

That is, the actuator 28 functions as a focus adjusting means which performs focus adjustment of the objective lenses 27a, 27b, as a tracking adjusting means which performs tracking adjustment, and further, as an objective lens changing means to change between the objective lens 27a and 27b one of which is disposed in the light path as well.

Now back to FIG. 1, a spherical aberration compensating element control portion 12 controls the spherical aberration compensating element 26 (See, FIG. 2) which is composed of liquid crystal element. Hereinafter, a structure of the spherical aberration compensating element 26 will be described. FIG. 5A, 5B are diagrams to explain the structure of the spherical aberration compensating element 26 in the present embodiment, FIG. 5A is a schematic cross sectional view to show the structure of the spherical aberration compensating element 26 and FIG. 5B is a schematic plan view to show the structure of a transparent electrode 32a which composes the spherical aberration compensating element 26.

The spherical aberration compensating element 26 includes a liquid crystal 31, two transparent electrodes 32a, 32b which sandwich the liquid crystal 31, two transparent base 33 which sandwich a part that is formed by the liquid crystal 31 and the transparent electrodes 32a, 32b. The transparent electrode 32a which composes the spherical aberration compensating element 26 is divided into a plurality of regions in a concentric pattern. On the other hand, the transparent electrode 32b which opposes to the transparent electrode 32a is not divided and forms one common electrode as a whole.

When driving voltage is applied to the transparent electrodes 32a, 32b in the spherical aberration compensating element 26 which is structured as above described, the light beam passing through the spherical aberration compensating element 26 generates phase difference in response to the applied voltage to the spherical aberration compensating element 26, because the liquid crystal 31 changes orientation direction of the liquid crystal 31 and generates change in refractive index. Because the transparent electrode 32a of the spherical aberration compensating element 26 is structured as a plurality of the divided regions as described above, it becomes possible to perform properly spherical aberration compensation by adjusting the applied voltages to each of the divided regions to generate desired phase difference for the light beam which passes through the spherical aberration compensating element 26. Here, the transparent electrode 32a, 32b are connected electrically to the spherical aberration compensating element control portion 12 by wires (not shown) to control applied driving voltage.

Here, in the present embodiment, the liquid crystal element is utilized as the spherical aberration compensating element 26 in the structure, however, the present invention is not limited to the structure and it is possible to employ a structure in which a beam expander is utilized as the spherical aberration compensating element 26, and the like.

Now back to FIG. 1, the amplitude obtaining portion 13 receives S shaped waveform information of the focus error signal from the focus error signal processing portion 9 to obtain amplitude of this S shaped waveform. The amplitude of S shaped waveform which is obtained in the amplitude obtaining portion is supplied to a discriminating portion 14 whose details will be described later.

The discriminating portion 14 makes it possible to discriminate whether the objective lens 27 disposed in the light path of the optical pickup device 4 is the objective lens 27a for a CD/DVD or the objective lens 27b for a BD. The discriminating portion 14 is configured to be able to control the driving voltage which is applied to the spherical aberration compensating element 26 by outputting a command to the spherical aberration compensating element control portion 12, and is configured to receive the amplitude of S shaped waveform obtained in the amplitude obtaining portion 13. Details of a method to discriminate kind of the objective lens 27 by the discriminating portion 14 which is structured as described above, will be described later.

In addition, a total control portion 17 controls the spindle motor control portion 3, the slide motor control portion 5, the RF signal processing portion 6, the demodulating portion 7, the interface portion 8, the focus error signal processing portion 9, the tracking error signal processing portion 10, the actuator control portion 11, the spherical aberration compensating element control portion 12, the amplitude obtaining portion 13, the discriminating portion 14, the memory portion 16 which memorizes necessary information for controlling, and the like to control a total device.

(Method for Discriminating Kind of an Objective Lens)

Figure 6:
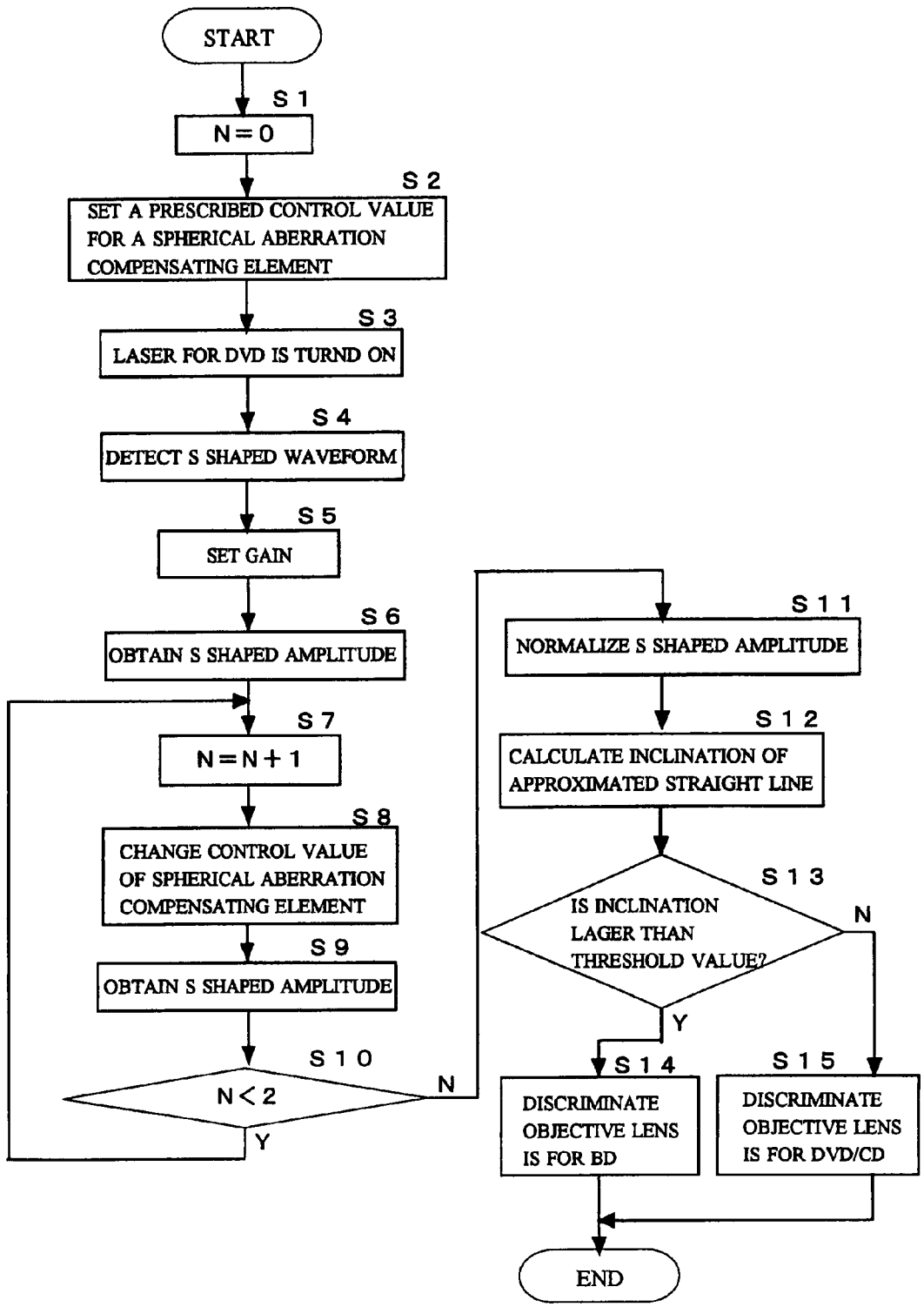
FIG. 6 is a flowchart to show process to discriminate kind of objective lens in the optical disc apparatus according to the present embodiment.

Next, in the optical disc apparatus 1 which is structured as described above, the discriminating method to discriminate whether the objective lens 27 disposed in the light path of the optical pickup device 4 is the objective lens 27a for a CD/DVD or the objective lens 27b for a BD will be described. FIG. 6 is a flowchart to show process to discriminate kind of the objective lens 27 in the optical disc apparatus 1. Hereinafter, an explanation will be given according to this flowchart.

The discrimination of kind of the objective lens 27 disposed in the light path in the optical pickup device 4 is begun when a power source of the optical disc apparatus 1 is turned on, when kind of the objective lens 27 is changed from the objective lens 27a for a CD/DVD to the objective lens 27b for a BD, when a change is performed from the objective lens 27b for a BD to the objective lens 27a for a CD/DVD, or the like.

When the discrimination of kind of objective lens 27 disposed in the light path in the optical pickup device 4 is begun, firstly, set N=0, and it is memorized in the memory portion 16 (See, FIG. 1) (Step S1). Next, by a command from the discriminating portion 14 (See, FIG. 1) the spherical aberration compensating element control portion 12 (See, FIG. 1) sets a prescribed control value for the spherical aberration compensating element 26 (See, FIG. 2) (Step S2). When the prescribed control value is set for the spherical aberration compensating element 26, the light beam for a DVD is emitted from the second light source 22 (See, FIG. 2) (Step S3). Here, kind of the laser beam emitted is not limited especially, the laser beam for a CD or the laser beam for a BD also may be utilized.

Next, the objective lens 27 is moved in a direction which becomes closer to the optical disc 15 (or it is no problem in a direction which becomes away from the optical disc 15, here, both of them are in the focusing direction) by the actuator 28, and S shaped waveform of the focus error signal is detected (Step S4). At this point, because the detecting level of the S shaped waveform becomes different in response to difference of degree of reflection of the optical disc 15, setting of gain is performed in order to detect better S shaped waveform (Step S5).

When the setting of gain is performed, amplitude of S shaped waveform (hereinafter, it is also referred to as "S shaped amplitude") is obtained by the amplitude obtaining portion 13, and the obtained amplitude is memorized in the memory portion 16 (Step S6).

Next, the value N is added by one according to a formula N=N+1 (Step S7) and by a command from the discriminating portion 14 the spherical aberration compensating element control portion 12 changes the driving voltage (controlled variable) to drive the spherical aberration compensating element 26 in a prescribed amount (Step S8). Then, the S shaped amplitude is obtained by the amplitude obtaining portion 13 in a state where the control value of the spherical aberration compensating element 26 is different from the former obtaining. The obtained amplitude is memorized in the memory portion 16 (Step S9).

Next, it is confirmed whether N is smaller than 2 or not by the discriminating portion 14 (Step S10). When N is smaller than 2, from Step S7 to Step S10 are repeated further. That is, in the present embodiment, the S shaped amplitude is obtained for three cases where the control values to control the spherical aberration compensating element 26 are different.

When N is equal to or larger than two, for three of the obtained S shaped amplitude, normalization is performed such that the S shaped amplitude which is obtained first (corresponding to that is obtained in Step S6) becomes a constant value (Step S11). Here, in the present embodiment, a structure is employed in which value of each of the three obtained S shaped amplitude is divided by value of the S shaped amplitude which is obtained first.

Here in the present embodiment, a structure is employed in which the normalization is performed such that the S shaped amplitude which is obtained first becomes the constant value. However, a structure may be also no problem that the normalization is performed such that the S shaped amplitude which is obtained second or third becomes the constant value, instead that the normalization is performed such that the S shaped amplitude which is obtained first becomes the constant value.

Next, an inclination of approximated straight line is calculated which shows relation between the controlled variable of the spherical aberration compensating element and the S shaped amplitude from the control value of the spherical aberration compensating element 26 and the three normalized S shaped amplitude (Step S12). Here, the inclination of approximated straight line calculated in this step, is not affected by variations in degree of reflection of the optical disc 15 because the S shaped amplitude normalized in Step S11 is used.

Figure 7:
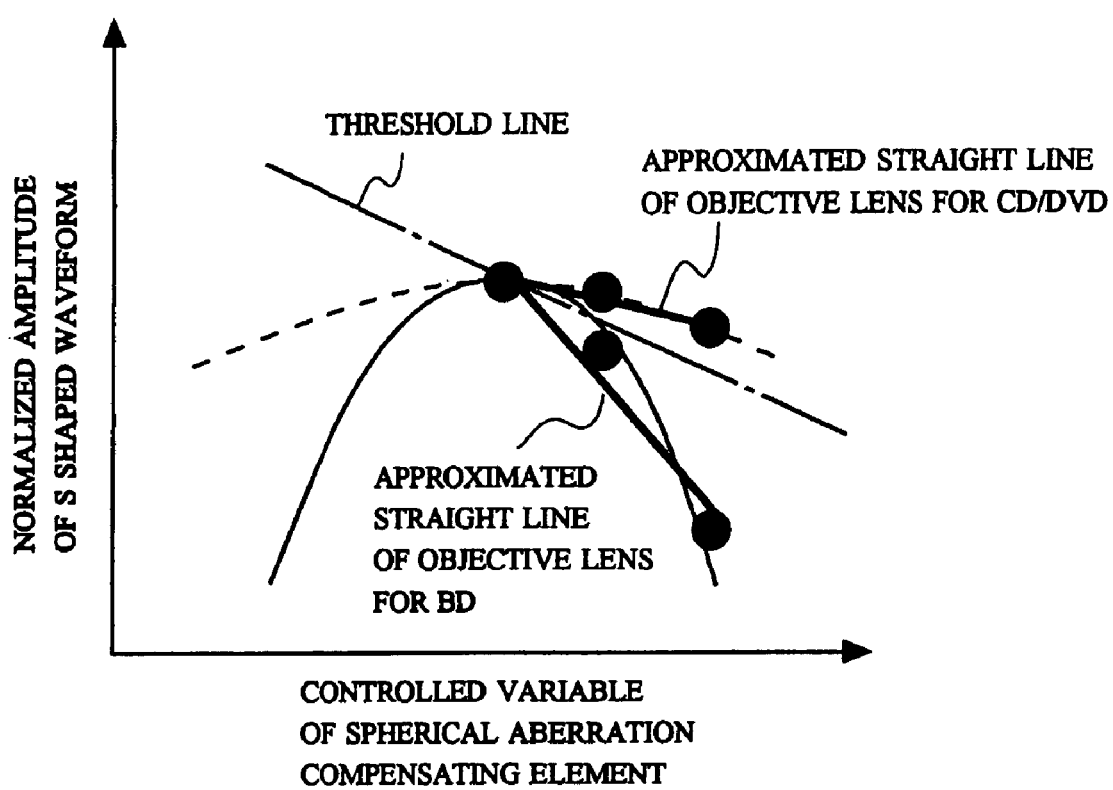
FIG. 7 is a graph to show conceptually relation between controlled variable of the spherical aberration compensating element and amplitude of S shaped waveform which has been normalized.

FIG. 7 is a graph to show conceptually relation between controlled variable of the spherical aberration compensating element and the S shaped amplitude which has been normalized (solid line and broken line). Black spots and an approximated straight lines of the black spots shown in the drawing show how the S shaped amplitude vary for cases the three control values of the spherical aberration compensating element 26 are changed when the objective lens 27a for a CD/DVD is disposed in the light path and when the objective lens 27b for a BD is disposed in the light path.

As shown in FIG. 7, if the controlled variable of the spherical aberration compensating element 26 is changed, it is understood that the S shaped amplitude varies more largely (to be influenced easily by spherical aberration) and the inclination of approximated straight line becomes larger in the case where the objective lens 27b for a BD is disposed in the light path in comparison with the case where the objective lens 27a for a CD/DVD is disposed in the light path.

Therefore, if a threshold line which is shown in FIG. 7 is obtained beforehand by experiment or the like in order to distinguish the objective lens 27a for a CD/DVD and the objective lens 27b for a BD, it becomes possible to discriminate kind of the objective lens 27 disposed in the light path by using this inclination of the threshold line as a threshold value.

Therefore, when it is confirmed whether the inclination of approximated straight line which is obtained in Step S12 is larger than the threshold value which has been memorized beforehand in the memory portion 16 or not (Step S13), if the inclination of approximated straight line is larger than the threshold value, it is discriminated that the objective lens 27 is the objective lens 27b for a BD (Step S14), and if the inclination of approximated straight line is equal to or smaller than the threshold value, it is discriminated that the objective lens 27 is the objective lens 27a for a CD/DVD (Step S15).

As above described, it is possible to discriminate correctly kind of the objective lens 27 disposed in the light path in the optical disc apparatus 1. Therefore, the improper setting of the objective lens can be prevented because the optical disc apparatus 1 can arrange properly the objective lens 27 in the light path based on result of discrimination by the discriminating portion 14.

In the present embodiment, a structure is employed in which changing of the control value of the spherical aberration compensating element 26 is performed for three points and discrimination of kind of the objective lens is performed based on variation of S shaped amplitude on these three points. However, the present invention is not limited to this structure, and it is not a problem that changing of the control value is performed for at least two or more. At this point because problems are caused that there is a possibility of improper discrimination when number of changing points is too little, that it takes so long time to discriminate when the number of changing points is too much and the like, it is preferable that the number of changing points of the control value is decided in consideration of the point.

Here, as for the control value of the spherical aberration compensating element 26 which is changed when kind of objective lens is discriminated, if in a case where the control value is selected to sandwich a vertex of parabola which is shown in solid line in FIG. 7, for example, because there is a possibility that correct approximated straight line is not obtained, it is necessary to pay enough attention to select the control value.

Further, in the present embodiment a structure is employed in which two kinds of objective lenses which are the objective lens for a CD/DVD and the objective lens for a BD are discriminated, however, the present invention can be applied for the discrimination of kind of objective lenses other than these two kinds, of course. In addition, the present invention can be applied for the discrimination of kind of the objective lenses of three or more kinds. In this case, comparison of small or large is not performed for one threshold value like the present embodiment, a plurality of threshold values has been obtained beforehand and kind of the objective lens is decided by the comparison of small or large for a plurality of threshold values.

In addition, a structure is employed in which changing of the objective lenses is performed by utilizing the actuator which performs the focus control or the tracking control in the present embodiment. However, the discriminating method for kind of the objective lens according to the present invention can be applied to a structure in which an actuator dedicated for only changing the objective lenses is arranged separately to perform changing of the objective lenses, of course.

According to the present invention, an improper setting of the objective lenses can be prevented because the discrimination of kind of the objective lens is performed correctly in the optical disc apparatus which includes a plurality of objective lenses. Therefore, the present invention is useful for the optical disc apparatus which includes a plurality of objective lenses.

What is claimed is:

1. An optical disc apparatus comprising:
a plurality of light sources emitting light beams having different wavelengths respectively;
a plurality of objective lenses one of which is disposed selectively in a light path in response to an optical recording medium to condense on a recording surface of the optical recording medium a light beam emitted from one of the plurality of light sources, which is selected in accordance to the optical recording medium;
a spherical aberration compensating element disposed between the plurality of light sources and the objective lens disposed in the light path to perform compensation of spherical aberration;
a memory portion memorizing information;
an amplitude obtaining portion obtaining S shaped waveform of focus error signal by emitting the light beam from one of the plurality of light sources and moving the objective lens disposed in the light path in an optical axis direction and obtaining amplitude from the S shaped waveform; and
a discriminating portion changing controlled variable of the spherical aberration compensating element into a plurality of prescribed control values, obtaining, for each of the plurality of prescribed control values, the amplitude of S shaped waveform from the amplitude obtaining portion, and performing discrimination to determine whether one of the plurality of objective lenses is disposed in the light path based on the differences of changing rates of the amplitude of S shaped waveform changed from the controlled variable among the plurality of objective lenses.

2. The optical disc apparatus according to claim 1, wherein the discriminating portion normalizing the amplitude of S shaped waveform obtained such that the amplitude of S shaped waveform obtained for one of the plurality of prescribed control values is a constant, calculating an inclination of approximated straight line showing relation between the controlled variable and the normalized amplitude of S shaped waveform, and discriminating whether one of the plurality of objective lenses is disposed in the light path by comparison between the inclination of approximated straight line and a threshold value memorized beforehand in the memory portion.

3. A discriminating method for an objective lens, discriminating the objective lens disposed in a light path of an optical pickup device including;
a plurality of light sources emitting light beams having different wavelengths respectively;
a plurality of objective lenses one of which is disposed selectively in the light path in response to kind of an optical recording medium to condense on a recording surface of the optical recording medium a light beam emitted from one of the plurality light sources, which is selected in accordance to the optical recording medium; and a spherical aberration compensating element disposed between the plurality of light sources and the objective lens disposed in the light path to perform compensation of spherical aberration, the discriminating method comprising:

a first step changing controlled variable of the spherical aberration compensating element into a plurality of prescribed control values, and obtaining, for each of the plurality of prescribed control values, S shaped waveform of focus error signal by emitting the light beam from one of the plurality of light sources, moving the objective lens disposed in the light path in an optical axis direction and obtaining amplitude from the S shaped waveform;

a second step normalizing the amplitude of S shaped waveform obtained such that the amplitude of S shaped waveform obtained for one of the plurality of prescribed control values is a constant;

a third step calculating an inclination of approximated straight line showing relation between the controlled variable and the normalized amplitude of S shaped waveform;

a fourth step deciding whether one of the plurality of objective lenses is disposed in the light path by comparison between the inclination of approximated straight line and a threshold value obtained beforehand.

* * * * *